United States Patent
Wang et al.

(10) Patent No.: US 8,165,629 B2
(45) Date of Patent: Apr. 24, 2012

(54) BASE STATION FOR ELECTRONIC APPARATUS

(75) Inventors: Kui-Jun Wang, Shenzhen (CN); Feng-Xiang Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 381 days.

(21) Appl. No.: 12/608,949

(22) Filed: Oct. 29, 2009

(65) Prior Publication Data

US 2011/0028185 A1    Feb. 3, 2011

(30) Foreign Application Priority Data

Jul. 29, 2009   (CN) .......................... 2009 1 0304959

(51) Int. Cl.
*H04M 1/00* (2006.01)
(52) U.S. Cl. .................................. 455/556.1; 455/575.1

(58) Field of Classification Search .................. 455/561, 455/571–573, 575.1, 556.1, 556.2, 557, 566, 455/90.3; 348/142, 143, 50, 208.11, 208.12
See application file for complete search history.

(56) References Cited

U.S. PATENT DOCUMENTS

| 8,054,042 B2* | 11/2011 | Griffin et al. | 320/115 |
| 2005/0014536 A1* | 1/2005 | Grady | 455/573 |
| 2009/0280871 A1* | 11/2009 | Hofer et al. | 455/573 |

* cited by examiner

*Primary Examiner* — Michael Faragalla
(74) *Attorney, Agent, or Firm* — Altis Law Group, Inc.

(57) ABSTRACT

The present invention provides a base station for an electronic apparatus. The base station includes a main body, a groove, a verifier and at least one motor. The main body is an empty body and accommodates the at least one motor. The groove is defined in the middle of the main body. The verifier is on one side of the main body. The groove accommodates two plates and at least one arc spring. Each arc spring is connected to the two plates. At least one screw is fixed on one plate. Each screw is connected to one motor through a corresponding screw hole. The number of motors, screws and holes are the same. The base station clamps the electronic apparatus between the two plates.

8 Claims, 6 Drawing Sheets

BASE STATION FOR ELECTRONIC APPARATUS

BACKGROUND

1. Technical Field

The disclosure relates to pedestals and, more particularly, to a base station for an electronic apparatus.

2. Description of the Related Art

When taking photographs using an electronic apparatus with a camera, such as a mobile phone, shakes may easily occur, due to the fact that the mobile phone is small and light, and thus resulting in a bad effect of photographs. Moreover, when a position of an object in the front of the mobile phone changes in a predetermined area, the user needs to manually adjust the camera of the mobile phone so as to follow the object and shoot pictures. Therefore, it is very inconvenient to utilize the mobile phone for the user to take photos.

BRIEF DESCRIPTION OF THE DRAWINGS

The components in the drawings are not necessarily drawn to scale, the emphasis instead being placed upon clearly illustrating the principles of the base station. Moreover, in the drawings, like reference numerals designate corresponding parts throughout the several views.

DETAILED DESCRIPTION

Figure 1:
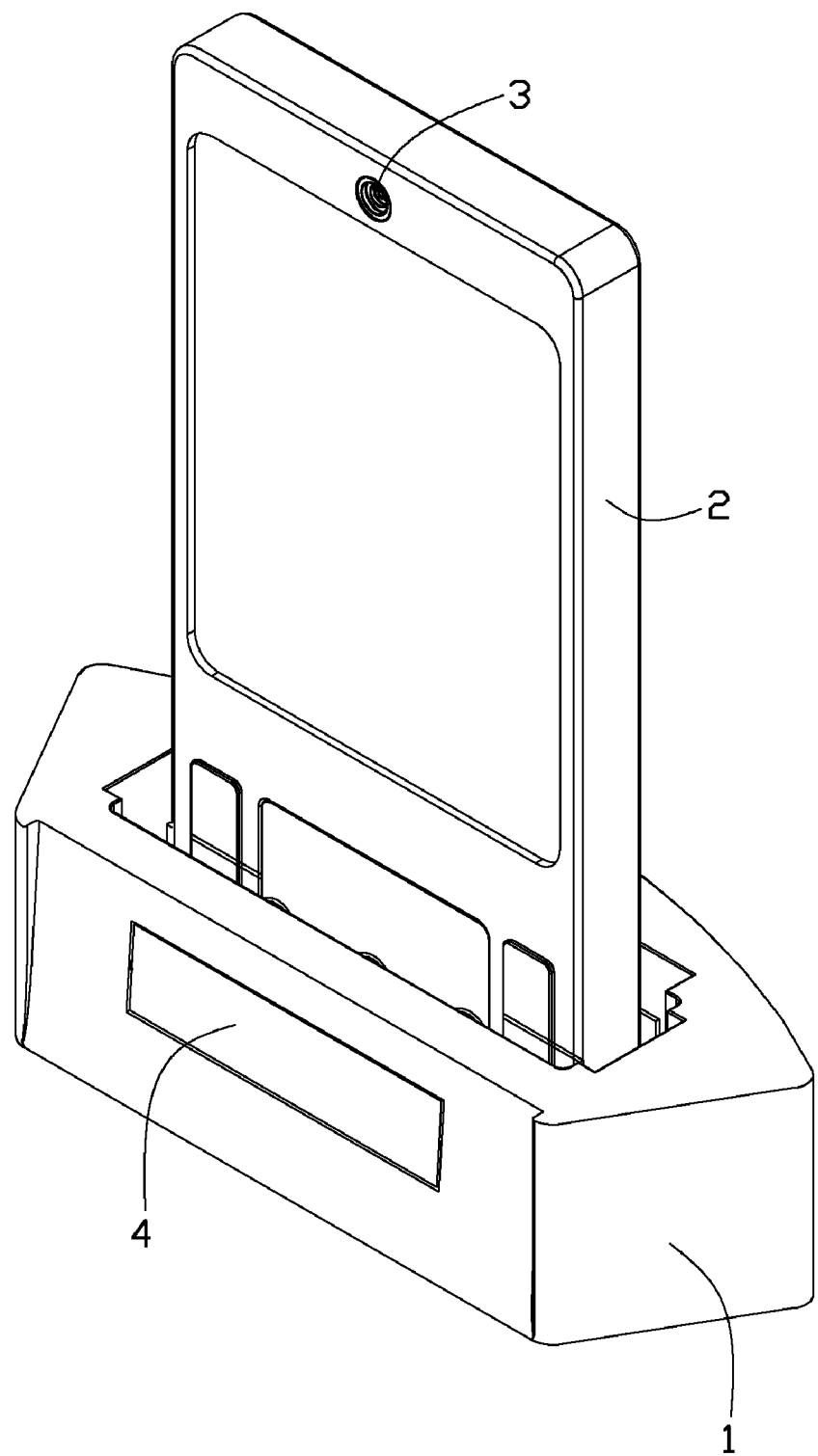
FIG. 1 is a perspective view of a base station and a mobile phone standing in the base station in an initial state in accordance with an embodiment.

FIG. 1 is a perspective view of a base station 1 and a mobile phone 2 standing in the base station in an initial state in accordance with an embodiment. The base station 1 is adapted for stationing an electronic apparatus, such as a mobile phone, a digital photo frame, and the like. For simple description, in this embodiment, the mobile phone 2 with a camera 3 is taken as the electronic apparatus for example. In an initial state such as that shown in FIG. 1, the mobile phone 2 vertically stands in the base station 1.

Figure 2:
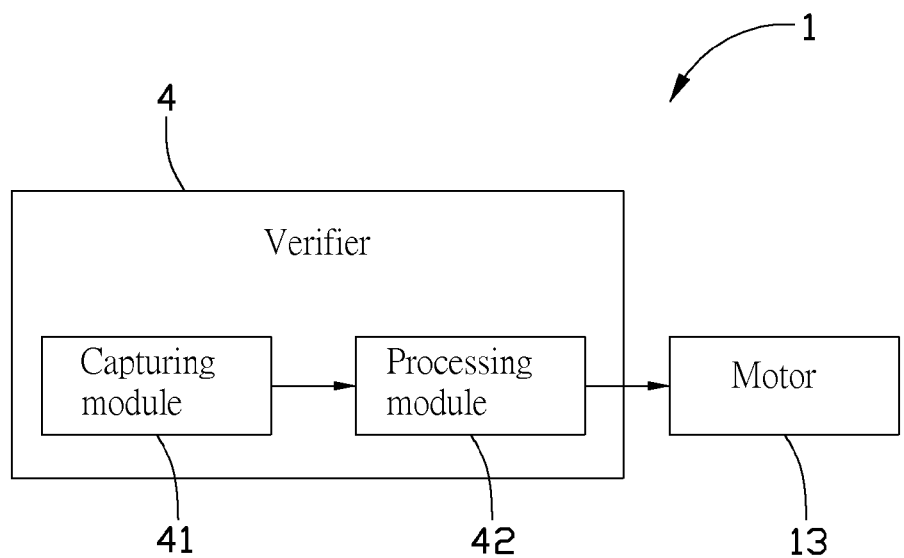
FIG. 2 is a block diagram of a hardware infrastructure of the base station of FIG. 1.

Referring to FIG. 2, the base station 1 includes a verifier 4 and at least one motor 13. The verifier 4 is positioned on one side of the base station 1. The verifier 4 further includes a capturing module 41 and a processing module 42. The capturing module 41 is configured for capturing a position of an object in the front of the mobile phone 2. The processing module 42 is configured for acquiring and recognizing the position of the object, and controlling the at least one motor 13 to perform an action.

Figure 3:
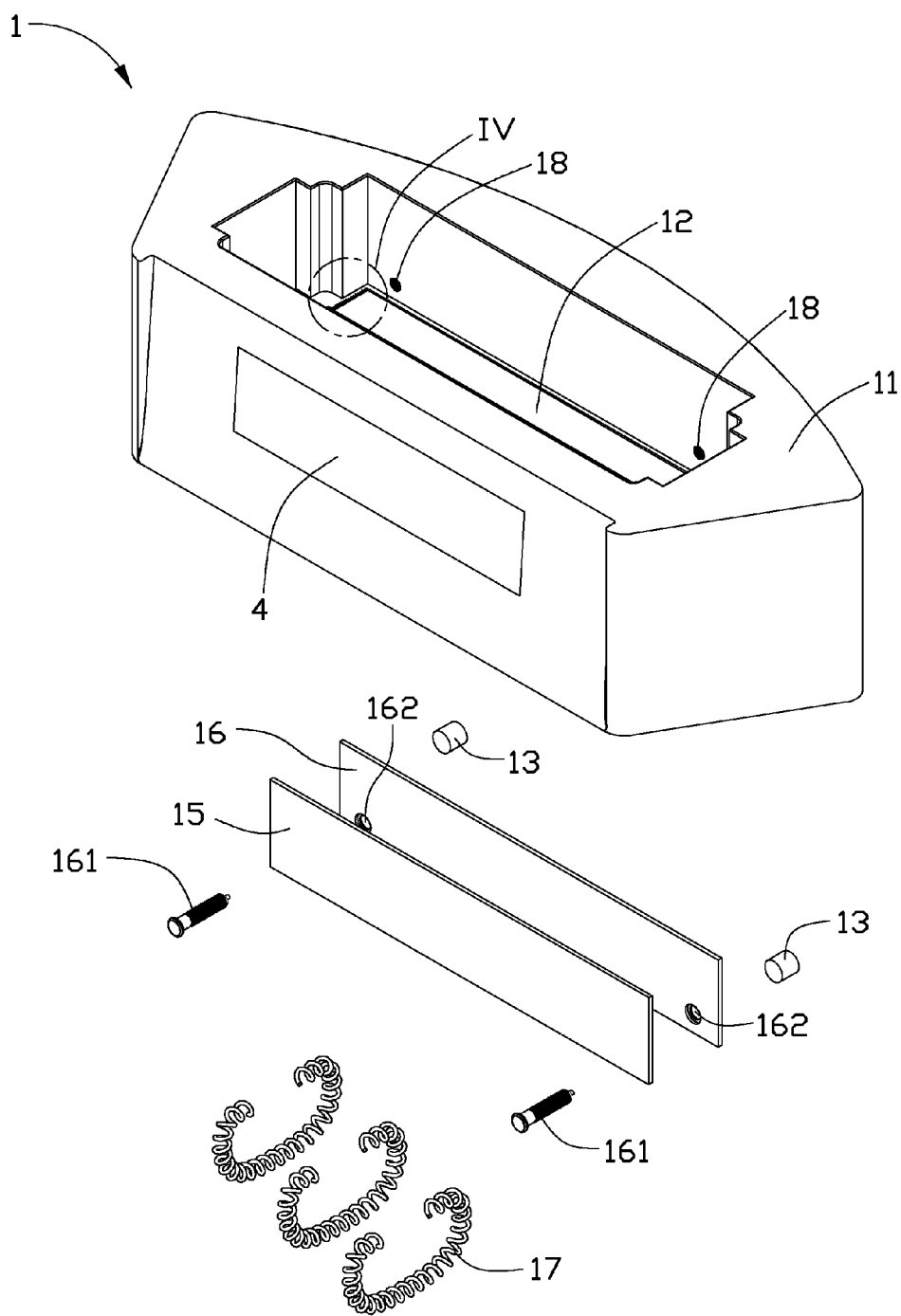
FIG. 3 is an exploded, perspective view of the base station of FIG. 1.
Figure 4:
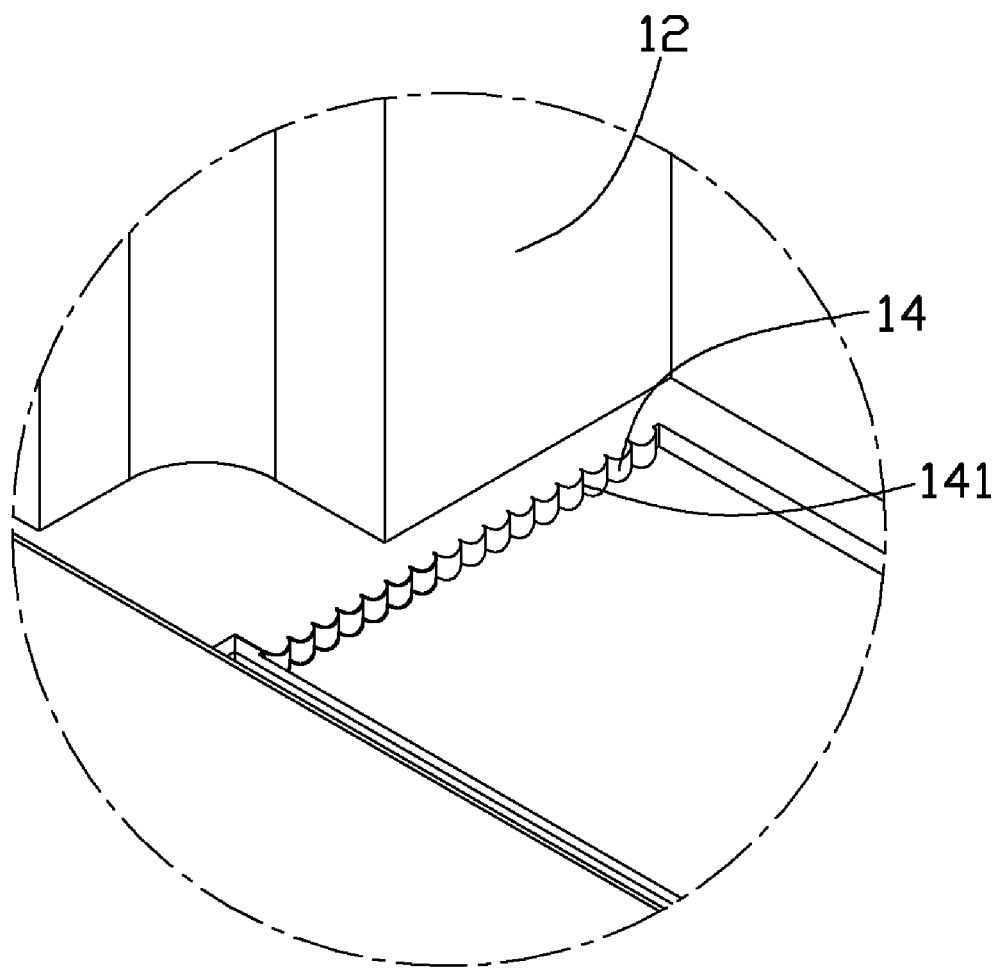
FIG. 4 is an enlarged view of the encircled portion of IV of FIG. 3.
Figure 5:
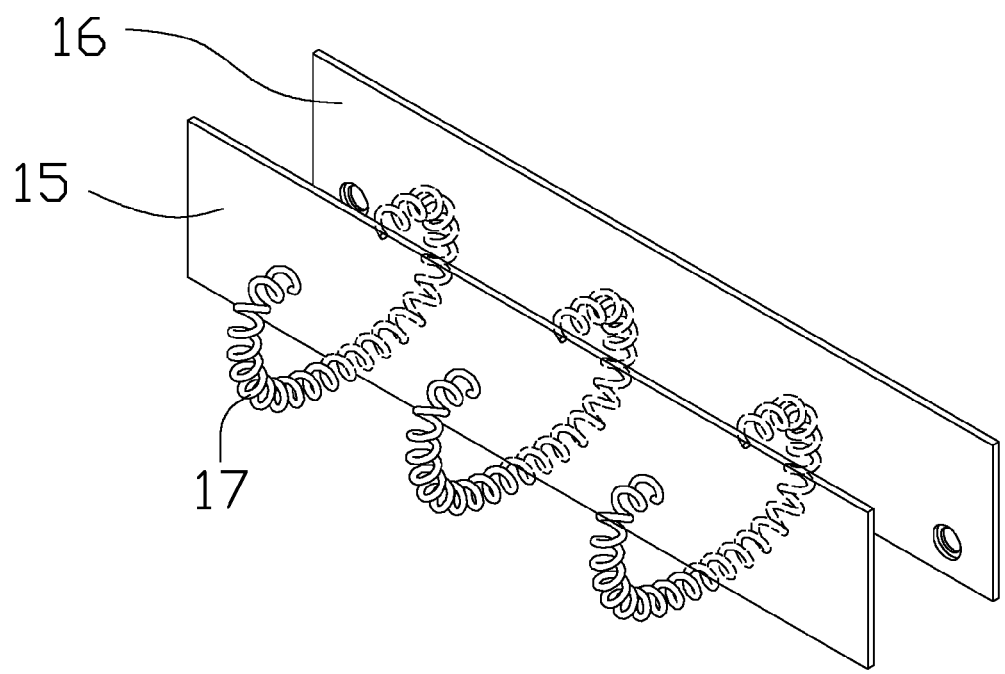
FIG. 5 is a perspective view of arc springs connected to two plates.

Referring to FIGS. 3-5, the base station 1 further includes a main body 11 with a groove 12 defined therein. The groove 12 is located in the middle of the main body 11. The main body 11 accommodates the at least one motor 13. In this embodiment, the number of the at least one motor 13 is two.

The groove 12 accommodates a first plate 15, a second plate 16, and at least one arc spring 17. The mobile phone 2 is clamped between the first plate 15 and the second plate 16. A height of the first plate 15 is the same as the height of the second plate 16. The height of the plate 15 or 16 is greater than or equal to about one third of a height of the mobile phone 2. When the mobile phone 2 moves at random angle between the two plates 15, 16, the mobile phone 2 can be still maintained in a steady state.

There are a plurality of teeth-like protruding portions 14 at the bottom of the groove 12, arranged on two opposite sides facing each other and each aligned in a linear manner. A space 141 is defined between each protruding portion 14 and the adjacent one. The plates 15 and 16 are inserted into one pair of the spaces 141 vertically. One end of each arc spring 17 is connected to the first plate 15, and the other end is connected to the second plate 16 through the bottom of the groove 12. In this embodiment, the number of the at least one arc spring 17 is three. The three arc springs 17 maintain the first plate 15 and the second plate 16 in corresponding spaces 141 at the bottom of the groove 12.

At least one screw hole 18 is defined on one side of the groove 12. In this embodiment, the number of the at least one screw hole 18 is two. Two circular holes 162 are defined in the second plate 16. One end of a screw 161 is fixed in the circle hole 162 of the second plate 16, and the other end of the screw 161 is twisted into the screw hole 18 and connected to the motor 13. Therefore, the second plate 16 is placed in the corresponding spaces 141 by the two screws 161. In another embodiment, at least one screw hole 18 is on another side of the groove 12 and the two circle holes 162 are defined in the first plate 15.

As compared to the fixed position of the second plate 16, the position of the first plate 15 can be adjusted to a corresponding pair of the spaces 141 according to the thickness of the mobile phone 2. Therefore, the base station 1 can be adapted for different thicknesses of mobile phones.

When the verifier 4 recognizes that the position of the object changes, the verifier 4 generates a control signal to the two motors 13, and each of the two motors 13 drives the corresponding screw 161 to move in the corresponding screw hole 18, and the second plate 16 is leaned along a predetermined orientation. The three arc springs 17 deform and generate a force, the first plate 15 is leaned along the predetermined orientation under the force, and thus, the mobile phone 2 is leaned along the predetermined orientation.

For example, in one embodiment, when the verifier 4 recognizes that the position of the object is moved up, the verifier 4 generates a first control signal to the two motors 13. The two motors 13 drive the two screws 161 to move in the screw holes 18 along a first orientation according to the first control signal, such as a clockwise orientation, that is, the two screws 161 move close to the two motors 13. Therefore, the two screws 161 enter the two screw holes 18 and the second plate 16 is leaned with a first angle, that is, the second plate 16 is leaned backward, and the mobile phone 2 is leaned backward along the first orientation.

Figure 6:
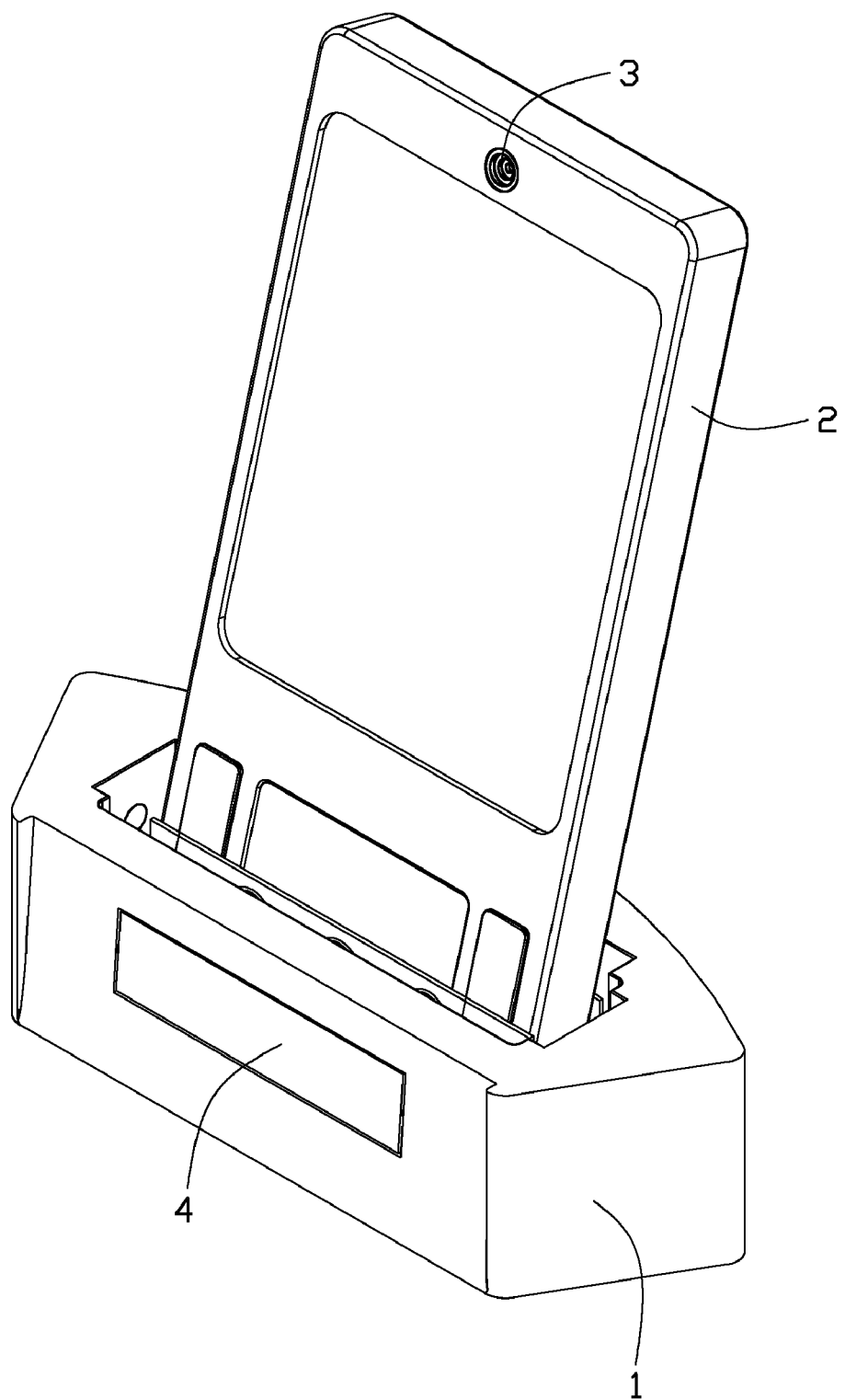
FIG. 6 is a perspective view of the base station and the mobile phone standing in the base station of FIG. 1 in a gradient state.

As shown in FIG. 6, the mobile phone 2 is leaned backward along the first orientation in a gradient state. The three arc springs 17 deform and generate a first force to the first plate 15. The first plate 15 leans backward to the mobile phone 2 and adjusts its position to a corresponding pair of spaces 141 in the groove 12 due to the first force. Therefore, the mobile phone 2 is steadily maintained in the base station 1.

In another embodiment, when the verifier 4 recognizes that the position of the object is moved down and generates a second control signal to the two motors 13. The two motors 13 drive the two screws 161 to move in the screw holes 18 along a second orientation according to the second control signal, such as a counterclockwise orientation, that is, the two screws 161 move far away from the two motors 13. Therefore, the two screws 161 leave out of the two screw holes 18 and the second plate 16 generates a second angle lean, that is, the second plate 16 is leaned forward, and the mobile phone 2 is leaned forward along the second orientation.

The three arc springs 17 deform and generate a second force to the first plate 15. The mobile phone 2 leans towards the first plate 15 and the first plate 15 adjusts its position to a corresponding pair of spaces 141 in the groove 12 due to the second force. Therefore, the mobile phone 2 is steadily maintained in the base station 1.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A base station for an electronic apparatus comprising:
a main body;
a groove defined in the main body;
a verifier configured on one side of the main body; and
at least one motor accommodated in the body of the main body;
wherein the groove accommodates two plates and at least one arc spring, the two plates are mounted at the bottom of the groove vertically, one of the two plates is fixed by at least one screw, each of the at least one arc spring is connected to the two plates, and at least one screw hole is defined in one side of the groove; the number of the at least one motor, the at least one screw, and the at least one screw hole are the same; each screw is connected to one motor through a corresponding screw hole, and the electronic apparatus is clamped between the two plates; and
the verifier recognizes that the position of an object in the front of the electronic apparatus changes and generates a control signal to the at least one motor, each motor drives the corresponding screw to move in the corresponding screw hole, the plate fixed by the at least one screw is leaned along a predetermined orientation, the at least one arc spring deforms and generates a force, the other plate is leaned along the predetermined orientation due to the force, and the electronic apparatus between the two plates is leaned along the predetermined orientation.

2. The base station as recited in claim 1, wherein the each number of the at least one motor, the at least one screw, and the at least one screw hole is two.

3. The base station as recited in claim 1, wherein the number of the at least one arc spring is three.

4. The base station as recited in claim 1, wherein there are a plurality of protruding portions at the bottom of the groove, arranged on two opposite sides facing each other and each aligned in a linear manner, a space is defined between each protruding portion and the adjacent one, and each plate is maintained in a pair of spaces.

5. The base station as recited in claim 4, wherein the plate fixed the at least one screw is placed in the pair of the spaces and the other plate adjusts its position to a corresponding pair of spaces according to the thickness of the electronic apparatus.

6. The base station as recited in claim 1, wherein the height of the two plates is the same.

7. The base station as recited in claim 6, wherein the height of each plate is greater than or equal to about one third of the height of the electronic apparatus.

8. The base station as recited in claim 1, wherein the verifier further comprises a capturing module and a processing module, the capturing module is configured for capturing a position of an object in the front of the electronic apparatus, and the processing module is configured for acquiring and recognizing the position of the object, and controlling the at least one motor to perform an action.

* * * * *